United States Patent
Noborimoto et al.

(10) Patent No.: US 6,940,798 B2
(45) Date of Patent: Sep. 6, 2005

(54) OPTICAL-DISK REPRODUCING APPARATUS, OPTICAL PICKUP APPARATUS AND OPTICAL-DISK RECORDING AND REPRODUCING APPARATUS

(75) Inventors: Kazutaka Noborimoto, Kanagawa (JP); Takashi Fukushima, Tokyo (JP); Yuhei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 09/998,208

(22) Filed: Dec. 3, 2001

(65) Prior Publication Data

US 2002/0085467 A1 Jul. 4, 2002

(30) Foreign Application Priority Data

Dec. 12, 2000 (JP) ........................................ 2000-378098

(51) Int. Cl.[7] .............................................. G11B 11/10
(52) U.S. Cl. ................... 369/53.22; 369/44.23; 369/44.12; 369/53.19; 369/94; 369/112.02; 369/118; 369/126
(58) Field of Search ........................... 369/53.22, 44.23, 369/112.02, 118, 126, 44.12, 53.19, 94, 53.2, 44.24, 44.29, 44.36, 739

(56) References Cited

U.S. PATENT DOCUMENTS 5,703,856 A * 12/1997 Hayashi et al. ............. 369/53.2
5,734,637 A * 3/1998 Ootaki et al. .......... 369/112.02
5,742,437 A * 4/1998 Eguchi et al. ............... 359/739
5,787,061 A * 7/1998 Tsuchiya et al. .......... 369/44.29
5,793,735 A   8/1998 Oono
6,321,028 B1 * 11/2001 Kajiyama et al. ........... 386/126
6,690,632 B1 * 2/2004 Sato et al. ................. 369/53.19
6,885,616 B2 * 4/2005 Kikuchi et al. ........... 369/44.23

* cited by examiner

*Primary Examiner*—William Korzuch
*Assistant Examiner*—Kim-Kwok Chu
(74) *Attorney, Agent, or Firm*—Oblon, Spivak, McClelland, Maier & Neustadt, P.C.

(57) ABSTRACT

The present invention is capable of selectively reproducing an information signal from an optical disk with any of a plurality of types having different track pitches of recording tracks, that is, capable of selectively reproducing an information signal from an optical disk having a low or high recording density by determining the type of the optical disk, that is, determining whether a mounted optical disk is a low-recording-density optical disk or a high-recording-density optical disk. The present invention deliberately generates aberration in an optical beam by controlling a voltage applied to a liquid-crystal device in order to vary the diameter of the optical beam in accordance with the determined type of the optical disk. The present invention is thus characterized in that it is applicable to an optical pickup apparatus for changing the diameter of an optical beam in accordance with whether a mounted optical disk is a low-recording-density optical disk or a high-recording-density optical disk, as well as applicable to an optical-disk reproducing apparatus and an optical-disk recording & reproducing apparatus that employ the optical pickup apparatus.

9 Claims, 6 Drawing Sheets

OPTICAL-DISK REPRODUCING APPARATUS, OPTICAL PICKUP APPARATUS AND OPTICAL-DISK RECORDING AND REPRODUCING APPARATUS

BACKGROUND OF THE INVENTION

The present invention relates to an optical pickup apparatus for recording an information signal onto an optical disk and reading out an information signal recorded on the optical disk from the optical disk by using an optical beam radiated by a single light source at a single wavelength, as well as relates to an optical-disk reproducing apparatus and an optical-disk recording & reproducing apparatus, which employ the optical pickup apparatus, wherein the optical disk can have a plurality of types having different recording densities of the information signal due to different track pitches of recording tracks created on the optical disk.

Conventionally, efforts have been made to increase the recording density of an information signal recorded on an optical disk used as a recording medium for recording the information signal. In the case of a magneto-optical disk having a diameter of about 64 mm, for example, the track pitch of recording tracks for recording an information signal on an optical disk has been reduced from 1.6 microns to 0.95 microns only to be decreased again to 0.55 microns. As a result, there has been proposed a magneto-optical disk having a recording density increased by 5 to 10 or more times.

To record an information signal onto an magneto-optical disk having a track pitch reduced as described above and to read out an information signal recorded on the magneto-optical disk from the magneto-optical disk, it is necessary to decrease the spot diameter of an optical beam used for scanning recording tracks created on the magneto-optical disk.

More specifically, if the spot diameter of the optical beam is large in comparison with the track pitch, tracking cannot be carried out with a high degree of accuracy. That is to say, an information signal cannot be recorded onto or read out from a desired recording track. In addition, the amount of cross talk caused by interference between recording tracks increases, inevitably lowering the SN (Signal to Noise) ratio.

Thus, to reduce the spot diameter of an optical beam radiated to the magneto-optical disk, there has been proposed use of an optical pickup apparatus having a light source for radiating an optical beam with a small wavelength. To record and read out an information signal onto and from a magneto-optical disk having a track pitch of 0.95 or 0.55 microns, for example, there has been proposed an optical-disk recording & reproducing apparatus employing an optical pickup apparatus provided with a semiconductor laser for emitting an optical beam with a wavelength of about 650 nm.

If an optical pickup apparatus provided with a semiconductor laser for emitting an optical beam with such a short wavelength is used to record and read out an information signal onto and from an magneto-optical disk having a track pitch of 1.6 microns, the spot diameter of the optical beam is too small in comparison with the width of the recording track. Thus, tracking of a desired recording track cannot be carried out with a high degree of accuracy. That is to say, an information signal cannot be recorded onto or read out from a desired recording track with a high degree of accuracy.

To enable an optical-disk recording & reproducing apparatus for recording and reproducing an information signal onto and from optical disks such as magneto-optical disks with different recording densities due to different track pitches to serve as an apparatus common to all the optical disks, there has been proposed an optical pickup apparatus having 2 light sources for generating an optical beam with a large wavelength and an optical beam with a small wavelength respectively.

This optical pickup apparatus employed in the optical-disk recording & reproducing apparatus is used by being switched from one of the light sources to the other so as to generate an optical beam with a wavelength appropriate for the track pitch of the optical disk mounted on the recording & reproducing apparatus.

As described above, the optical pickup apparatus having a plurality of light sources requires components for switching the generated optical beam from one optical path to another. As a result, the size of the optical pickup apparatus inevitably increases, making it difficult to employ the unit in an optical-disk recording & reproducing apparatus that is made as small in size as possible.

In addition, the power consumption of a semiconductor laser for emitting an optical beam having a wavelength of 650 nm is greater than the power consumption of a semiconductor laser for emitting an optical beam having a large wavelength, for example a wavelength of 780 nm. An optical pickup apparatus employing a semiconductor laser having a large power consumption is not suitable for a portable optical-disk recording & reproducing apparatus employing a battery as a power source.

Moreover, since a semiconductor laser having a large power consumption also has a large temperature coefficient and a large amount of heat dissipated by the semiconductor itself, it is necessary to take a measure for coping with the thermal dissipation of the semiconductor laser mounted on an optical pickup apparatus to get stable oscillation of an optical beam generated by the optical pickup apparatus. It is thus difficult to implement a small and thin optical pickup apparatus if such a measure is to be taken.

Furthermore, a semiconductor laser for emitting an optical beam having a small wavelength is more expensive than the widely used conventional semiconductor laser for emitting an optical beam having a wavelength of 780 nm. Thus, the cost of the optical pickup apparatus and, hence, the cost of the optical-disk recording & reproducing apparatus employing the optical pickup apparatus cannot be reduced.

SUMMARY OF THE INVENTION

It is thus an object of the present invention addressing the problems described above to provide an optical pickup apparatus for recording an information signal onto an optical disk and reading out an information signal recorded on the optical disk from the optical disk by using an optical beam radiated by a single light source at a single wavelength, as well as provide an optical-disk recording & reproducing apparatus employing the optical pickup apparatus, wherein the optical disk can have a plurality of types having different recording densities of the information signal due to different track pitches of recording tracks created on the optical disk.

It is another object of the present invention to make the optical pickup apparatus even smaller and even thinner as well as to reduce the size of an optical-disk recording & reproducing apparatus and an optical-disk reproducing apparatus, which employ the optical pickup apparatus.

It is a further object of the present invention to provide an optical pickup apparatus easy to manufacture and capable of generating a stable optical beam as well as to provide an optical-disk recording & reproducing apparatus and an optical-disk reproducing apparatus, which employ the optical pickup apparatus.

To achieve the objects described above, in accordance with an aspect of the present invention, there is provided an optical-disk reproducing apparatus capable of selectively reproducing an information signal from a first optical disk with recording tracks laid out thereon, being separated from each other by a track pitch equal to a first distance, or a second optical disk with recording tracks laid out thereon, being separated from each other by a track pitch equal to a second distance shorter than the first distance. The optical-disk reproducing apparatus includes a radiation means for radiating an optical beam to an optical disk mounted on the optical-disk reproducing apparatus, an objective lens for converging the optical beam radiated by the radiation means into an optical beam with a diameter smaller than the first distance but longer than the second distance, a liquid-crystal means provided on an optical path between the objective lens and the radiation means, a voltage-applying means for applying a driving voltage to the liquid-crystal means so as to change an electrode pattern of the liquid-crystal means, a discrimination means for determining whether an optical disk mounted on the optical-disk reproducing apparatus is a first optical disk or a second optical disk and a control means which drives the voltage-applying means to apply a driving voltage to the liquid-crystal means so as to generate such aberration in the optical beam that the diameter of the optical beam is set at a value close to the first distance when the discrimination means determines an optical disk mounted on the optical-disk reproducing apparatus to be a first optical disk.

In addition, in accordance with another aspect of the present invention, there is provided an optical pickup apparatus including a light source for emitting an optical beam having a wavelength of about 780 nm, an objective lens having a numerical aperture (NA) of about 0.62 and serving as a means for converging the optical beam emitted by the light source and then radiating the converged optical beam to an optical disk and a spot-diameter control means for controlling the spot diameter of the converged optical beam radiated by the objective lens to the optical disk The spot-diameter control means adjusts the spot diameter of the converged optical beam radiated by the objective lens to the optical disk to the track pitch of recording tracks formed on the optical disk. Thus, an information signal can be recorded onto and reproduced from an optical disk with any of a plurality of types having different track pitches.

The spot-diameter control means employed in the optical pickup apparatus is an aberration-generating means for generating aberration in the converged optical beam radiated by the objective lens to the optical disk. A liquid-crystal device is used as the aberration-generating means.

Furthermore, in accordance with a further aspect of the present invention, there is provided an optical-disk recording & reproducing apparatus capable of recording and reproducing an information signal onto and from an optical disk with any of a plurality of types having different track pitches of recording tracks created on the optical disk. The optical-disk recording & reproducing apparatus includes a disk-rotation-driving mechanism on which the optical disk with any of a plurality of types having different track pitches of recording tracks is to be mounted, a discrimination means for determining a type of an optical disk mounted on the disk-rotation-driving means, a light source for emitting an optical beam having a wavelength of about 780 nm, an objective lens having a numerical aperture (NA) of about 0.62 and serving as a means for converging the optical beam emitted by the light source and then radiating the converged optical beam to the optical disk and an optical pickup apparatus including a spot-diameter control means for controlling the spot diameter of the converged optical beam radiated by the objective lens to the optical disk, wherein the spot-diameter control means adjusts the spot diameter of the converged optical beam radiated by the objective lens to the optical disk in accordance with the type of the optical disk determined by the discrimination means.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

The following description explains an optical pickup apparatus provided by the present invention and an optical-disk recording & reproducing apparatus employing the optical pickup apparatus by referring to accompanying diagrams.

Figure 1:
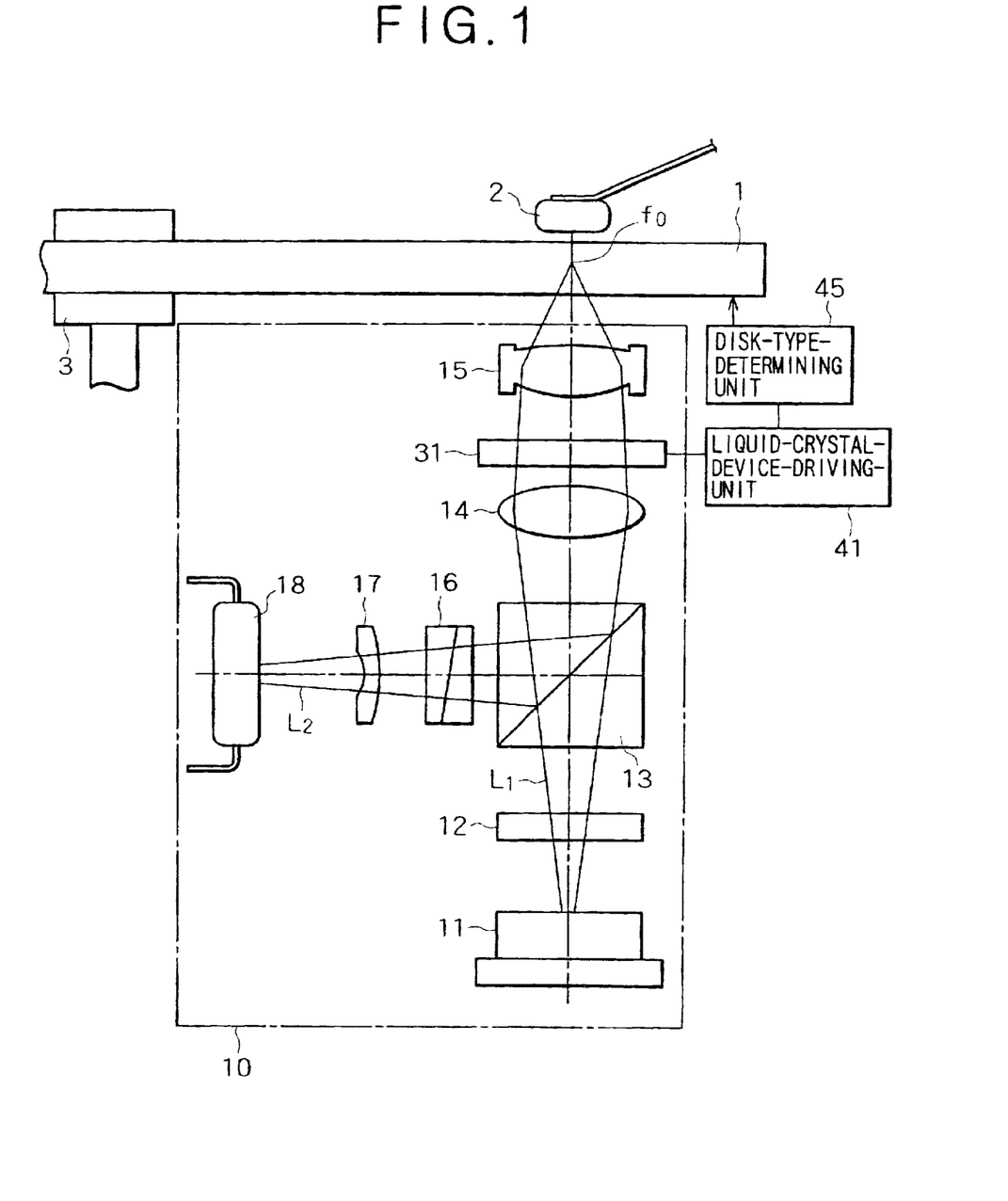
FIG. 1 is a block diagram showing an optical pickup apparatus provided by the present invention and an optical-disk recording & reproducing apparatus employing the optical pickup apparatus.

As shown in FIG. 1, an optical pickup apparatus 10 provided by the present invention is employed in an optical-disk recording & reproducing apparatus that uses an optical disk, specially a magneto-optical disk 1, as a recording medium. The optical-disk recording & reproducing apparatus employing the magneto-optical disk 1 as a recording medium is provided with a magnetic head 2 for applying an external magnetic field to the optical disk 1. The external magnetic field is modulated in accordance with an information signal to be recorded onto the optical disk 1. As shown in FIG. 1, the magnetic head 2 is placed at a position sandwiching the optical disk 1 in conjunction with the position of an objective lens 15 employed in the optical pickup apparatus 10. The position of the magnetic head 2 is symmetrical to the position of the objective lens 15 with respect to the optical disk 1 which is driven into rotation by a spindle motor 3. The magnetic head 2 moves in the radial direction of the optical disk 1 along with the optical pickup apparatus 10.

As shown in FIG. 1, the optical pickup apparatus 10 provided by the present invention and employed in the optical-disk recording & reproducing apparatus has a semiconductor laser 11 used as a light source for emitting and radiating an optical beam to a signal-recording surface of the optical disk 1.

In this embodiment, the semiconductor laser 11 emits an optical beam $L_1$ with a wavelength of about 780 nm. The semiconductor laser 11 is widely used as a light source of an optical pickup apparatus for recording and reproducing information onto and from an optical disk such as a compact disk that has a recording-track pitch of about 1.6 microns.

On the path of the optical beam $L_1$ emitted by the semiconductor laser 11, a beam splitter 13 is provided. A grading 12 is inserted between the semiconductor laser 11 and the beam splitter 13. The grading 12 divides the optical beam $L_1$ emitted by the semiconductor laser 11 into 2 beams, namely, a main beam and a sub-beam, to obtain a tracking-error signal by a 3-beam law.

The beam splitter 13 splits the optical beam $L_1$ radiated to the optical disk 1 and a returning optical beam $L_2$ reflected by the optical disk 1. The optical beam $L_1$ emitted by the semiconductor laser 11 passes through the beam splitter 13, propagating to the optical disk 1 by way of a collimator lens 14 and an objective lens 15. The optical beam $L_1$ is emitted from the semiconductor laser 11 as spreading rays forming a predetermined angle of radiation. These spreading rays are converged by the collimator lens 14 into parallel rays. The objective lens 15 further converges the parallel rays of the optical beam $L_1$ leaving the collimator lens 14 into converged rays and radiates the converged rays to the signal-recording surface of the optical disk 1.

The returning optical beam $L_2$ reflected by the optical disk 1 is again reflected by the beam splitter 13 to a photo detector 18 by way of an optical detector 16 and a multi-lens 17. The optical detector 16 converts the Kerr rotational angle of the returning optical beam $L_2$ into a light intensity. The photo detector 18 detects data recorded on the optical disk 1 on the basis of the magnitude of a luminous energy. The magnitude of the luminous energy varies in accordance with changes in polarization-plane rotational angle, which take place in the returning optical beam $L_2$ reflected by the optical disk 1 hit by the optical beam $L_1$. The photo detector 18 converts the luminous energy into an output electrical signal.

In this embodiment, the objective lens 15 for converging the parallel rays of the optical beam $L_1$ leaving the collimator lens 14 into converged rays and radiating the converged rays to the signal-recording surface of the optical disk 1 has a numerical aperture (NA) of about 0.62. The optical beam $L_1$, which passes through the objective lens 15, being converged thereby, has a wavelength of 780 nm. At a focal point $f_0$, the optical beam $L_1$ forms a beam spot Bs with a spot diameter Sr of about 1.53 microns.

That is to say, the optical beam $L_1$ having a wavelength of 780 nm is converged by the objective lens 15 having a numerical aperture (NA) of about 0.62 and radiated to the optical disk 1. The beam spot Bs having a spot diameter Sr of about 1.53 microns is formed on the signal-recording surface of the optical disk 1, which is positioned at the focal point $f_0$ of the objective lens 15.

Figure 2:
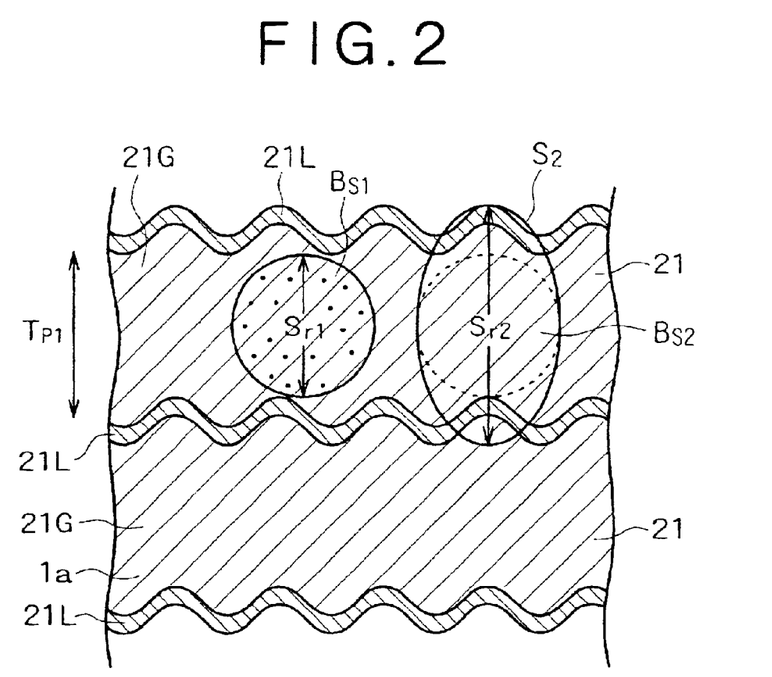
FIG. 2 is a diagram showing a top view of recording tracks formed on a first magneto-optical disk having a low recording density.

By the way, FIG. 2 is a diagram showing a top view of recording tracks 21 formed on a first typical magneto-optical disk 1a having a diameter of about 64 mm like the ordinary magneto-optical disk 1 and a recording capacity of 140 MB. As shown in the figure, the recording tracks 21 are formed with a track pitch $Tp_1$ of about 1.6 microns. A recording track 21 includes a groove 21G serving as an area for recording data and a wobbled land 21L. Two wobbled lands 21L are created on both sides of the groove 21G. The wobbled lands 21L are used for recording a tracking-control signal and an address detection signal.

Figure 3:
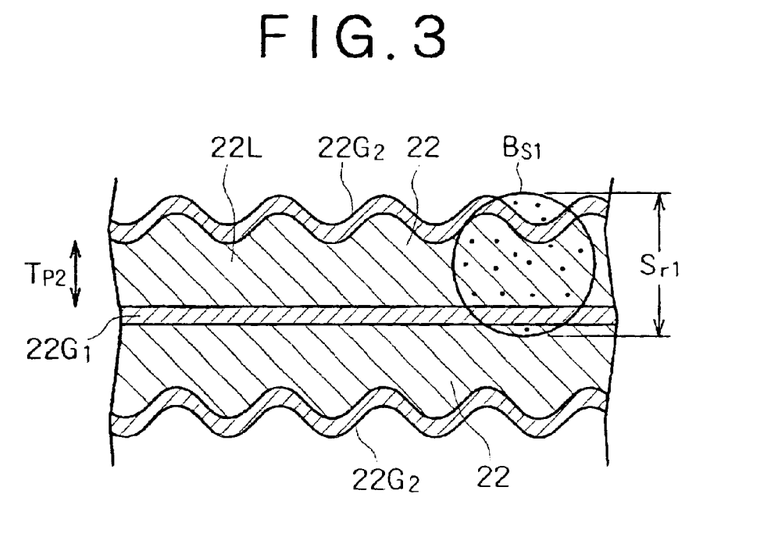
FIG. 3 is a diagram showing a top view of recording tracks formed on a second magneto-optical disk having a medium recording density.

FIG. 3 is a diagram showing a top view of recording tracks 22 formed on a second typical magneto-optical disk 1b having a diameter of about 64 mm like the ordinary magneto-optical disk 1 and a recording capacity of 650 MB. As shown in the figure, the recording tracks 22 are formed with a track pitch $Tp_2$ of about 0.95 microns.

A land 22L serves as the data-recording area in a recording track 22. On one side of the land 22L, a groove 22G1 is formed. On the other side of the land 22L, a wobbled groove $22G_2$ for separating the recording track 22 is formed for recording a tracking-control signal and an address detection signal.

Figure 4:
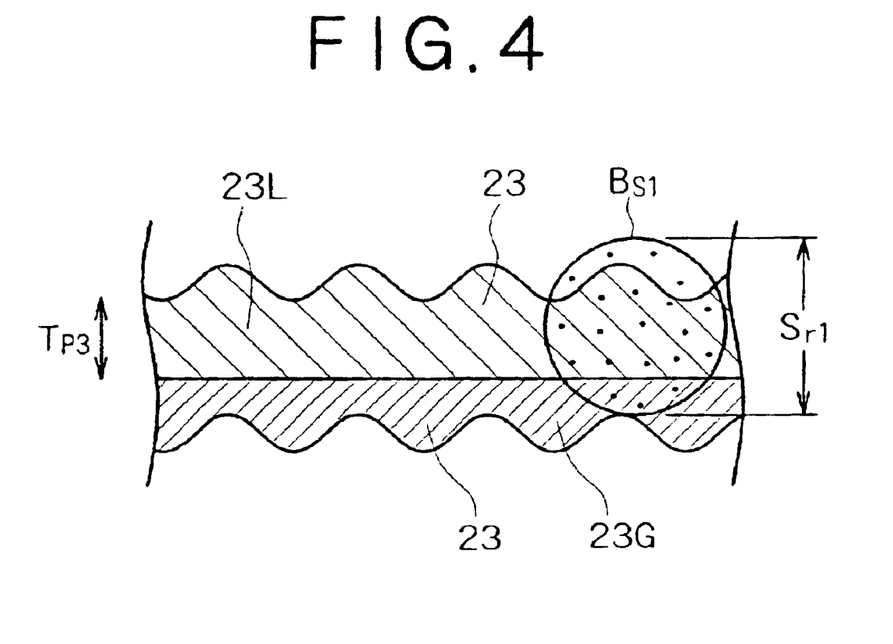
FIG. 4 is a diagram showing a top view of recording tracks formed on a third magneto-optical disk having a high recording density.

FIG. 4 is a diagram showing a top view of recording tracks 23 formed on a third typical magneto-optical disk 1c having a diameter of about 64 mm like the ordinary magneto-optical disk 1 and a recording capacity of up to 3 GB. As shown in the figure, the recording tracks 23 are formed with a track pitch $Tp_3$ of about 0.55 microns.

A land 23L and a groove 23G serve as data-recording areas of 2 adjacent recording tracks 23. This land 23L and this groove 23G face each other along an unwobbled side. The wobbled side of the land 23L and the wobbled side of the groove 23G are used for recording a tracking-control signal and an address detection signal.

By the way, to record an information signal onto a desired recording track on the optical disk 1 with a high degree of accuracy and to reproduce an information signal accurately from a desired recording track of the optical disk 1, it is necessary to accurately scan the optical disk 1 for the desired track by using an optical beam emitted by the optical pickup apparatus 10. To scan the optical disk 1 for a desired recording track by using the optical beam with a high degree of accuracy, at least, it is necessary to generate a tracking control signal and use the signal for controlling the scan position of the optical beam. To generate the tracking control signal and scan the optical disk 1 for a desired recording track, it is necessary to radiate the optical beam to the entire width of the recording track to detect a wobbled land or a wobbled groove created on one or both sides of the recording track and used for recording a tracking-control signal and an address detection signal.

In the optical pickup apparatus 10 provided by the present invention, the optical beam $L_1$ having a wavelength of about 780 nm is converged by the objective lens 15 having a numerical aperture (NA) of about 0.62 as described above. Thus, the spot diameter $Sr_1$ of a beam spot $Bs_1$ at the focal position of the objective lens 15 is about 1.53 microns.

As shown in FIGS. 3 and 4, the beam spot $Bs_1$ with the spot diameter $Sr_1$ thereof reduced to about 1.53 microns is formed over the entire width of the recording track 22 of the second optical disk 1b and the entire width of the recording track 23 of the third optical disk 1c. The track pitch $Tp_2$ of the recording track 22 on the second optical disk 1b and the track pitch $Tp_3$ of the recording track 23 on the third optical disk 1c are set at respectively 0.95 microns and 0.55 microns which are both smaller than 1.53 microns set for the spot diameter $Sr_1$ of the beam spot $Bs_1$. By creating the beam spot $Bs_1$ over the entire width of the recording track 22 and the entire width of the recording track 23 and setting the spot diameter $Sr_1$ at a value exceeding the track pitch $Tp_2$ of the recording track 22 and the track pitch $Tp_3$ of the recording track 23 as described above, the wobbled groove $22G_2$ and the wobbled land 23L or the wobbled groove 23G can be traced so that the tracking control signal can be generated for controlling the tracking position of the optical beam $L_1$. As described above, the wobbled groove $22G_2$ is formed on one side of the recording track 22 of the second optical disk 1b. On the other hand, the wobbled land 23L and the wobbled groove 23G are created respectively on both sides of the recording track 23 of the third optical disk 1c.

On the contrary, the track pitch $Tp_1$ of the recording track 21 on the first optical disk 1a is set at 1.6 microns, which are greater than 1.53 microns set for the spot diameter $Sr_1$ of the beam spot $Bs_1$ obtained as a result of the convergence of the optical beam $L_1$ by the optical pickup apparatus 10 provided by the present invention. Thus, the optical beam $L_1$ cannot be radiated to the entire width of the recording track 21 as shown in FIG. 2.

As a result, it is impossible to detect wobbled lands 21L formed on both the sides of the recording track 21 for recording a tracking-control signal and an address detection signal. In consequence, it is also impossible to generate the tracking control signal for controlling the tracking position of the optical beam $L_1$. In addition, since the tracking position cannot be detected, an information signal can be neither recorded nor reproduced.

To solve the problems described above, in accordance with the present invention, the spot diameter Sr of the beam spot Bs converged on the signal-recording surface of the optical disk 1 is made variable so that it is possible to scan the optical disk 1 for a desired recording track by using the optical beam $L_1$. It is thus possible to record and reproduce an information signal onto and from the optical disk 1 without regard to the track pitch Tp of recording tracks created on the optical disk 1. That is to say, it is possible to record and reproduce an information signal, be the track pitch Tp of the optical disk 1 small or large.

In particular, in accordance with the present invention, the spot diameter Sr of the beam spot Bs formed on the signal-recording surface of the optical disk 1 is treated as a controllable variable with the semiconductor laser 11 for emitting an optical beam having a wavelength of about 780 nm and the objective lens 15 having a numerical aperture (NA) of about 0.62 used as they are.

As a means for controlling the spot diameter Sr of the beam spot Bs formed on the signal-recording surface of the optical disk 1, there is provided an aberration-generating means for generating aberration in the optical beam $L_1$ converged by the objective lens 15 on the optical disk 1.

As the aberration-generating means, a liquid-crystal device 31 is used. The liquid-crystal device 31 is provided between the objective lens 15 and the beam splitter 13, which is used for separating the optical beam $L_2$ reflected by the optical disk 1 from the optical beam $L_1$ incident to the optical disk 1. It is desirable to place the liquid-crystal device 31 on a path of parallel rays of the optical beam $L_1$. As shown in FIG. 1, the liquid-crystal device 31 is located between the collimator lens 14 and the objective lens 15.

The following description explains the principle of operation of the liquid-crystal device 31, which functions as an aberration-generating means. The molecular orientation of a crystal of the liquid-crystal device 31 is controlled by a voltage applied to the liquid-crystal device 31. When a linear-polarization optical beam enters the liquid-crystal device 31, the polarization direction of the linear-polarization optical beam coincides with the molecular orientation.

That is to say, assuming that an optical beam A is an optical for which the polarization direction of the linear-polarization optical beam is parallel to the molecular orientation while an optical beam B is an optical for which the polarization direction of the linear-polarization optical beam is perpendicular to the molecular orientation, the optical beam A is generated at an optical phase lagging behind that of the optical beam B. The optical phase lag becomes a maximum when the voltage applied to the liquid-crystal device 31 is zero. As described above, by controlling the voltage applied to the liquid-crystal device 31, the molecular orientation of the liquid crystal can be changed. Thus, the optical phase lag of the optical beam A behind the optical B can also be controlled as well. As a result, by locally controlling the molecular orientations of the crystals composing the liquid-crystal device 31, local phase lags can be generated among optical beams passing areas of the liquid-crystal device 31, which have different molecular orientations.

The optical beams having local phase differences are converged by a convergence lens such as the objective lens 15 to generate optical aberrations at the focal point due to the local phase differences. Typically, local shapes cause phase differences corresponding to astigmatism. As a result, the spot diameter Sr of the optical beam $L_1$ converged by the objective lens 15 is increased.

Figure 5:
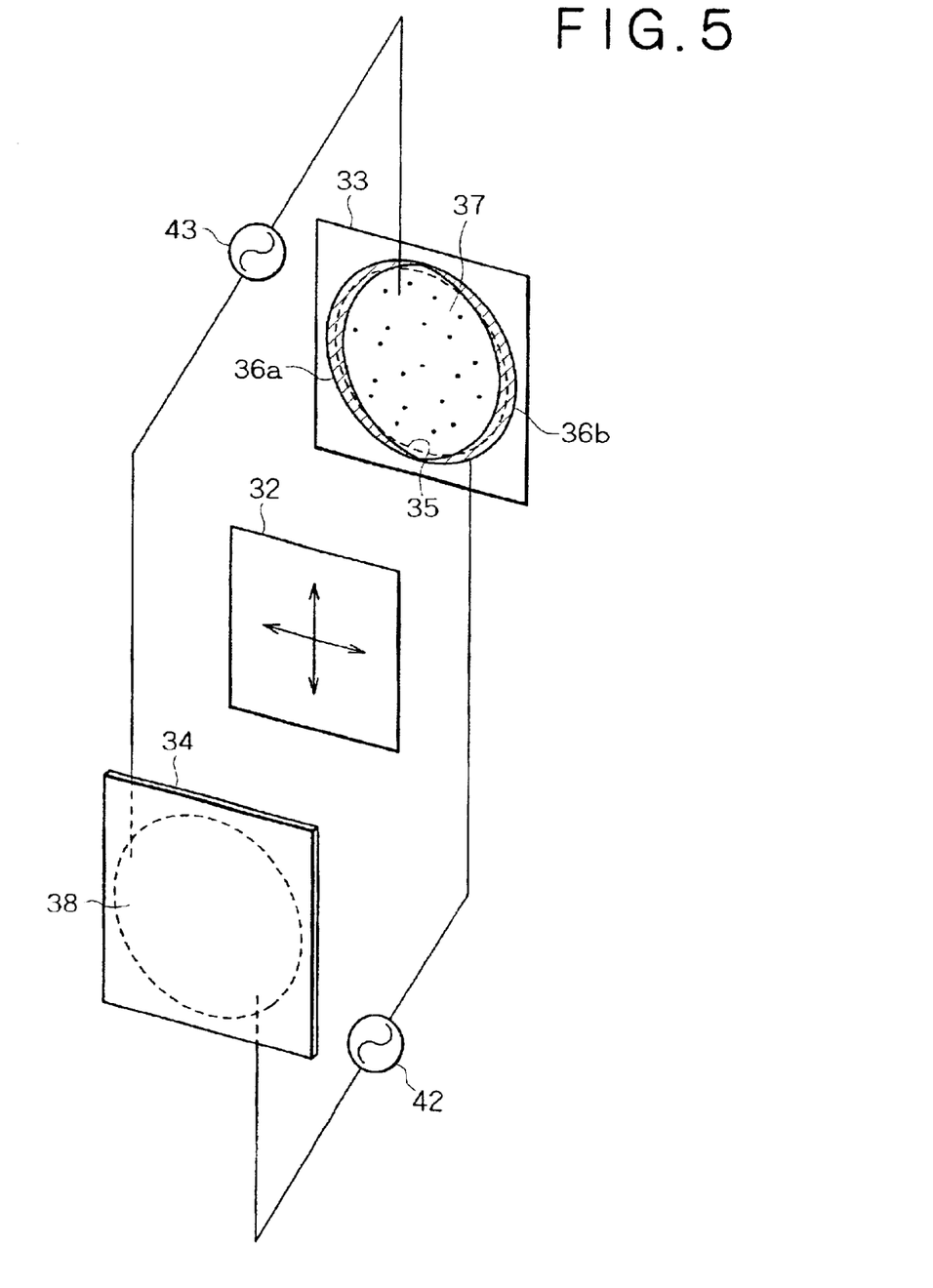
FIG. 5 is a diagram showing a perspective view of a liquid-crystal device employed in an aberration-generating means provided by the present invention.
Figure 6:
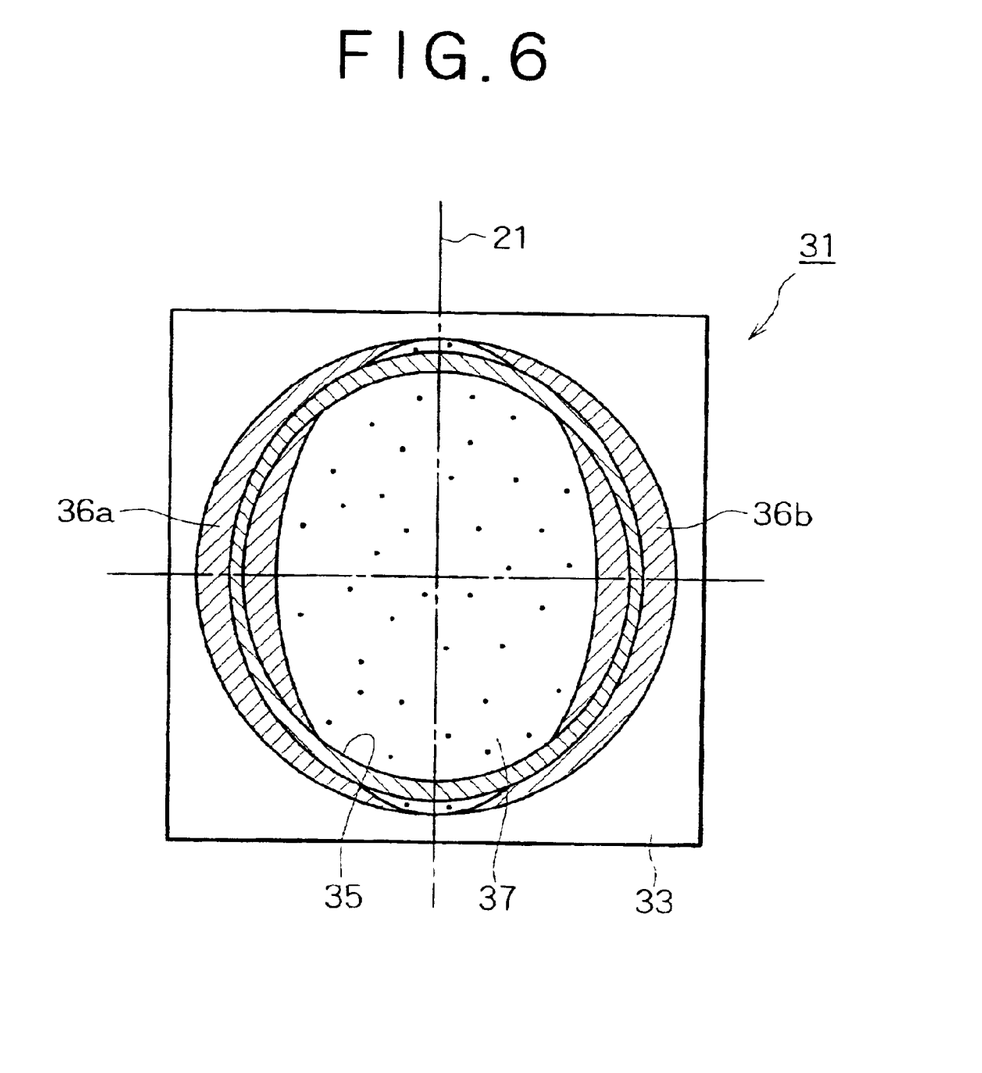
FIG. 6 is a diagram showing a top view of first and second electrode patterns set in the liquid-crystal device.

The liquid-crystal device 31 employed in the optical pickup apparatus 10 provided by the present invention is explained concretely as follows. As shown in FIG. 5, the liquid-crystal device 31 includes a first electrode plate 33, a second electrode plate 34 and a liquid-crystal plate 32, which are sandwiched by the first electrode plate 33 and the second electrode plate 34. As shown in FIG. 6, the first electrode plate 33 includes a pair of first electrode patterns 36a and 36b in addition to a second electrode pattern 37 having an elliptical shape. Electrically connected to each other, the first electrode patterns 36a and 36b each have an arc form so that the first electrode patterns 36a and 36b partially veil mutually interfacing both sides of an area corresponding to a circular aperture 35 through which the optical beam passes. The second electrode pattern 37 is formed on the area corresponding to the circular aperture 35, which is enclosed by the first electrode patterns 36a and 36b. On the second electrode plate 34, there is formed a common electrode pattern 38 facing the first electrode patterns 36a and 36b as well as the whole second electrode pattern 37. The first electrode patterns 36a and 36b are created on the first electrode plate 33.

As shown in FIG. 5, a first driving power supply 42 is connected between the common electrode pattern 38 and the pair of first electrode patterns 36a and 36b. By the same token, a second driving power supply 43 is connected between the common electrode pattern 38 and the second electrode pattern 37. The first driving power supply 42 and the second driving power supply 43 are connected to a liquid-crystal-driving unit 41, which is connected to the liquid-crystal device 31 as shown in FIG. 1. The first driving power supply 42 connected between the common electrode pattern 38 and the pair of first electrode patterns 36a and 36b generates a driving voltage having an electric potential equal to or different from the driving voltage generated by the second driving power supply 43 connected between the common electrode pattern 38 and the second electrode pattern 37.

The driving voltage applied between the common electrode pattern 38 and the pair of first electrode patterns 36a and 36b as well as the driving voltage applied between the common electrode pattern 38 and the second electrode pattern 37 are controlled in accordance with the type of the optical disk 1 mounted on the optical-disk recording & reproducing apparatus employing the optical pickup apparatus 10 provided by the present invention.

The type of the optical disk 1 is determined by a disk-type-determining unit 45 employed in the optical-disk recording & reproducing apparatus shown in FIG. 1 typically when the optical disk 1 is mounted on the optical-disk recording & reproducing apparatus. Information on the type is then supplied to the liquid-crystal-driving unit 41. The liquid-crystal-driving unit 41 controls the driving voltage applied between the common electrode pattern 38 and the pair of first electrode patterns 36a and 36b as well as the driving voltage applied between the common electrode pattern 38 and the second electrode pattern 37 in accordance with the type of the optical disk 1.

The disk-type-determining unit 45 may determine the type of an optical disk, which has anyone of various track pitches and is accommodated in a disk cartridge, on the basis of an identification hole provided on the disk cartridge. The disk-type-determining unit 45 may also determine the type of an optical disk in dependence on whether or not address information recorded in advance on a track of the disk can be reproduced from the track with a focus servo turned on.

Such address information can be reproduced if the beam diameter is large enough for tracing the track. On the other hand, such address information cannot be reproduced if the beam diameter is not large enough for tracing the track.

If the disk-type-determining unit 45 detects an operation to mount the second magneto-optical disk 1b or the third magneto-optical disk 1c, which has a small track pitch Tp, on the optical-disk recording & reproducing apparatus, control is executed so that the liquid-crystal-driving unit 41 applies a voltage V1 between the common electrode pattern 38 and the pair of first electrode patterns 36a and 36b and applies the same voltage V1 between the common electrode pattern 38 and the second electrode pattern 37 in the optical pickup apparatus 10 provided by the present invention. The applied voltage V1 is controlled to such a level that the molecular orientations of the crystals in the entire area of the circular aperture 35 coincide with the polarization direction of the linear polarization optical beam $L_1$ incident to the liquid-crystal device 31. As described above, the area of the circular aperture 35 is an area corresponding to the second electrode pattern 37 and the pair of first electrode patterns 36a and 36b.

The linear polarization optical beam $L_1$ incident to the liquid-crystal device 31 controlled so that the molecular orientations of the crystals in the entire area of the circular aperture 35 coincide with the polarization direction of the linear polarization optical beam $L_1$ reaches the objective lens 15, which passes on the optical beam $L_1$ as it is without generating optical aberrations at the focal point due to the local phase differences. Thus, the linear polarization optical beam $L_1$ is converged without causing astigmatism due to phase differences. As a result, the linear polarization optical beam $L_1$ having a wavelength of about 780 nm is converged by the objective lens 15 having a numerical aperture (NA) of about 0.62 to form a beam spot $Bs_1$ having a spot diameter $Sr_1$ of about 1.53 microns on a recording track 22 of the second magneto-optical disk 1b or a recording track 23 of the third magneto-optical disk 1c. In this state, the beam spot $Bs_1$ is capable of recording an information signal onto the recording track 22 of the second magneto-optical disk 1b or the recording track 23 of the third magneto-optical disk 1c, or reproducing an information signal from the recording track 22 of the second magneto-optical disk 1b or the recording track 23 of the third magneto-optical disk 1c as shown in FIGS. 3 and 4.

If the disk-type-determining unit 45 detects an operation to mount the first magneto-optical disk 1a having a large track pitch Tp on the optical-disk recording & reproducing apparatus, on the other hand, control is executed so that the liquid-crystal-driving unit 41 applies the voltage V1 between the common electrode pattern 38 and the second electrode pattern 37, and applies a voltage V2 having an electric potential different from the voltage V1 between the common electrode pattern 38 and the pair of first electrode patterns 36a and 36b in the optical pickup apparatus 10 provided by the present invention.

That is to say, the voltage V1, which is applied between the common electrode pattern 38 and the second electrode pattern 37 when the first magneto-optical disk 1a is mounted on the optical-disk recording & reproducing apparatus, is controlled to such a level that the molecular orientations of the crystals in the entire area of the circular aperture 35 coincide with the polarization direction of the linear polarization optical beam $L_1$ incident to the liquid-crystal device 31. Thus, an optical beam $L_{1a}$ incident to an area of the liquid-crystal device 31, in which the second electrode pattern 37 is created, is passed on as it is without generating a phase lag to the objective lens 15.

On the other hand, the voltage V2 applied between the common electrode pattern 38 and the pair of first electrode patterns 36a and 36b is controlled to such a level that the molecular orientations cause an optical beam $L_{1b}$ to propagate at a predetermined phase lag. The optical beam $L_{1b}$ is part of the optical beam $L_1$ passing through the circular aperture 35. In particular, this part or the optical beam $L_1$ passes through an area of the liquid-crystal device 31, in which the pair of first electrode patterns 36a and 36b is created. In this way, the optical beam $L_{1b}$, that is, the part or the optical beam $L_1$ passes through an area of the liquid-crystal device 31, in which the pair of first electrode patterns 36a and 36b is created, propagates at a predetermined phase lag. As a result, there is generated a phase difference from the optical beam $L_{1a}$ incident to an area of the liquid-crystal device 31, in which the second electrode pattern 37 is created.

Figure 7:
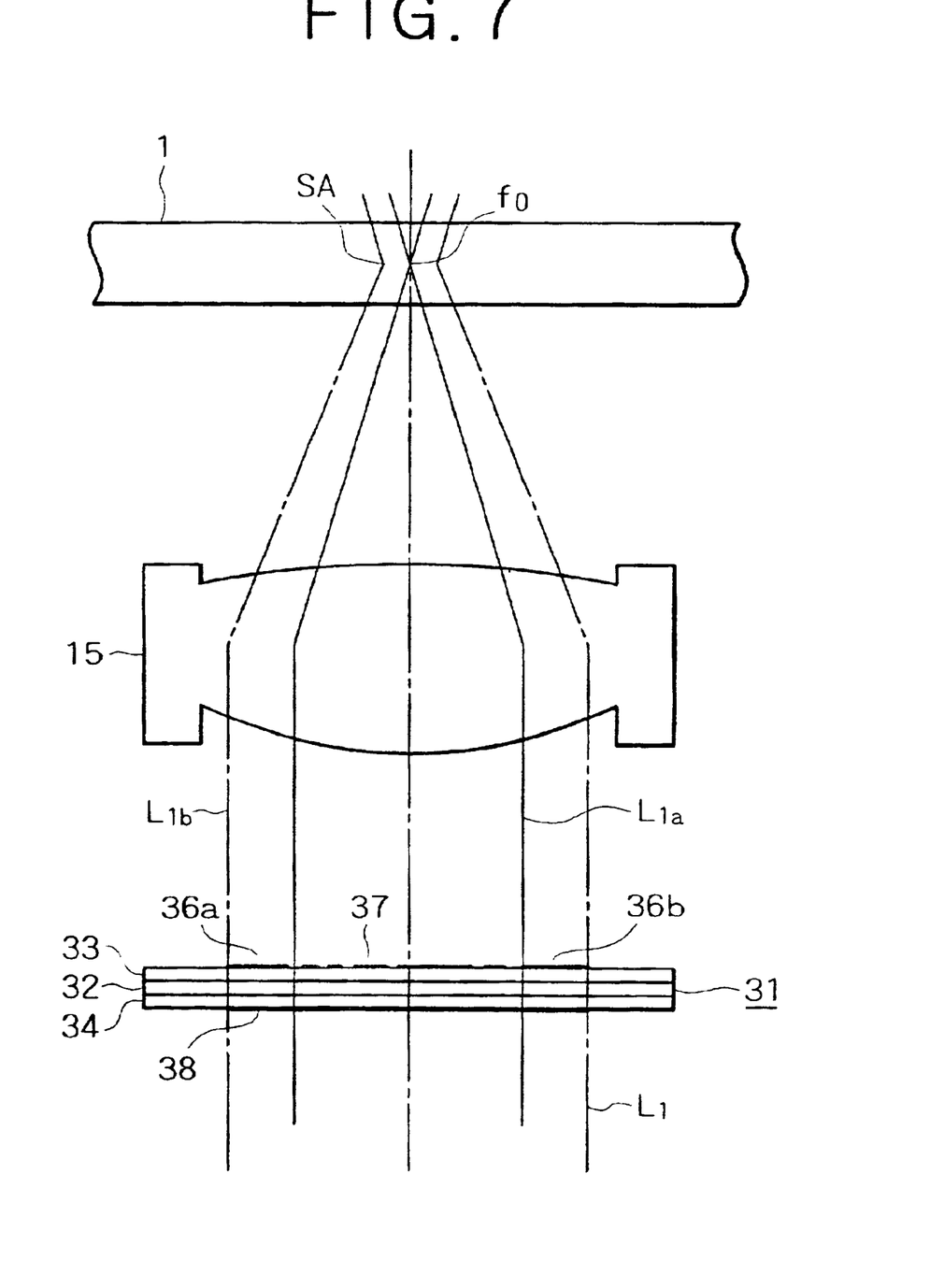
FIG. 7 is a diagram showing a partial cross section of the optical pickup apparatus in a state of generating astigmatism in an optical beam radiated to the magneto-optical disk.

As shown in FIG. 7, the optical beam $L_1$ locally displaying a phase difference as described above generates astigmatism Sa as aberration corresponding to the phase difference at a position of the focal point $f_0$ of the objective lens 15. By generating the astigmatism Sa in this way, a beam spot $S_2$ of the optical beam $L_1$ formed at the position of the focal point $f_0$ of the objective lens 15 can be changed as shown in FIG. 2. The formed beam spot $B_2$ has a lengthened spot diameter $Sr_2$ for a portion extended by the astigmatism Sa.

Thus, to radiate the optical beam $L_1$ over the entire width of the recording track 21 created on the magneto-optical disk 1a wherein the width of the recording track 21 is greater than the original spot diameter $Sr_1$ of the optical beam $L_1$, the spot diameter $Sr_1$ needs to be extended to cover both the edges of the recording track 21 like a spot diameter $Sr_2$ shown in FIG. 2. For this reason, the first electrode patterns 36a and 36b for locally generating a phase lag in the optical beam $L_1$ passing through the liquid-crystal device 31 are positioned in the liquid-crystal device 31 at both the sides of the transversal direction of the recording track 21 created on the optical disk 1 as shown in FIG. 6. By arranging the liquid-crystal device 31 in this way, the astigmatism is generated in the transversal direction of the recording track 21 and the beam spot $Bs_2$ can be enlarged also in the transversal direction of the recording track 21. Thus, the optical beam $L_1$ having a small spot diameter Sr in comparison with the track pitch Tp can be used for tracing over the entire width of the recording track 21 having a large track pitch Tp.

At that time, the astigmatism is generated only in the transversal direction of the recording track 21, and generation of the astigmatism in the longitudinal direction of the recording track 21 can be suppressed. Thus, the optical beam $L_1$ can be utilized with a high degree of efficiency in operations to record and reproduce an information signal.

It should be noted that the second voltage V2 applied to the first electrode patterns 36a and 36b for controlling the molecular orientations of the crystals so as to cause the optical beam $L_{1b}$ to propagate at a predetermined phase lag is set at a proper level corresponding to the astigmatism Sa to be generated.

As described above, the embodiment implements an optical pickup apparatus using a magneto-optical disk as a recording medium and an optical-disk recording & reproducing apparatus employing the optical pickup apparatus. It should be noted, however, that the present invention can also be applied to an optical pickup apparatus capable of selectively using an optical disk having any of a plurality of types with track pitches different from each other as well as an optical-disk recording & reproducing apparatus and an optical-disk reproducing apparatus that employ the optical pickup apparatus.

As described above, in accordance with the present invention, the spot diameter of an optical beam converged on an optical disk by a spot-diameter control means is adjusted in accordance with the track pitch of recording tracks created on an optical disk. It is thus possible to record and reproduce an information signal onto and from an optical disk having any of a plurality of types with track pitches different from each other. To be more specific, by using an optical beam generated by a single light source at a single wavelength, it is possible to record and reproduce an information signal onto and from an optical disk having any of a plurality of types with recording densities different from each other due to different track pitches of recording tracks formed on the optical disk. As a result, it is possible to provide an optical pickup apparatus having a simple configuration and a small size as well as an optical-disk recording & reproducing apparatus and an optical-disk reproducing apparatus that employ the optical pickup apparatus.

In particular, as the light source, the present invention employs a semiconductor laser which has been widely used to serve as a means for oscillating an optical beam having a wavelength of 780 nm. It is thus possible to reduce the price of the optical pickup apparatus as well as an optical-disk recording & reproducing apparatus and an optical-disk reproducing apparatus that employ the optical pickup apparatus. In addition, the semiconductor laser used as a means for oscillating an optical beam having a wavelength of 780 nm has low power consumption, a small temperature coefficient and a small amount of heat dissipated by the semiconductor laser itself in comparison with a semiconductor laser used as a means for oscillating an optical beam having a small wavelength. It is thus unnecessary to take a measure for coping with the thermal dissipation in order to get stable oscillation of an optical beam generated by the semiconductor laser mounted on the optical pickup apparatus. As a result, it is easy to implement a small and thin optical pickup apparatus.

While a preferred embodiment of the present invention has been described using specific terms, such description is for illustrative purposes only, and it is to be understood that changes and variations may be made without departing from the spirit or scope of the following claims.

What is claimed is:

1. An optical pickup apparatus comprising:
   a light source for emitting an optical beam having a wavelength of about 780 nm;
   an objective lens having a numerical aperture (NA) of about 0.62 and serving as a means for converging said optical beam emitted by said light source and then radiating said converged optical beam to said optical disk;
   a spot-diameter control means for controlling a spot diameter of said converged optical beam radiated by said objective lens to said optical disk;
   a liquid-crystal means provided on an optical path between the objective lens and the radiation means; and
   a voltage-applying means for applying a driving voltage to the liquid-crystal means so as to change an electrode pattern of the liquid-crystal means.

2. An optical pickup apparatus according to claim 1 wherein said spot-diameter control means is an aberration-generating means for generating aberration in said converged optical beam radiated by said objective lens to said optical disk.

3. An optical pickup apparatus according to claim 2 wherein:
   said aberration-generating means is a liquid-crystal device; and
   a driving voltage applied to an electrode pattern of said liquid-crystal device is controlled to adjust the spot diameter of said converged optical beam radiated by said objective lens to said optical disk.

4. An optical-disk recording & reproducing apparatus capable of recording and reproducing an information signal onto and from an optical disk with any of a plurality of types having different track pitches of recording tracks created on said optical disk, said optical-disk recording & reproducing apparatus comprising:
   a disk-rotation-driving mechanism on which any one of optical disks with any of said types having different track pitches of recording tracks is to be selectively mounted;
   a discrimination means for determining a type of an optical disk mounted on said disk-rotation-driving means;
   a light source for emitting an optical beam having a wavelength of about 780 nm;
   an objective lens having a numerical aperture (NA) of about 0.62 and serving as a means for converging said optical beam emitted by said light source and then radiating said converged optical beam to an optical disk; and
   a spot-diameter control means for controlling a spot diameter of said converged optical beam radiated by said objective lens to said optical disk,
   wherein said spot-diameter control means adjusts said spot diameter of said converged optical beam radiated by said objective lens to said optical disk in accordance with the type of said optical disk determined by said discrimination means.

5. An optical-disk recording & reproducing apparatus according to claim 4, wherein said spot-diameter control means is an aberration-generating means for generating aberration in said converged optical beam radiated by said objective lens to said optical disk.

6. An optical-disk recording & reproducing apparatus according to claim 5, wherein:

said aberration-generating means comprises a liquid-crystal device and a driving-voltage-applying means for applying a driving voltage to said liquid-crystal device; and said driving voltage applied by said driving-voltage-applying means to an electrode pattern of said liquid-crystal device is controlled to adjust the spot diameter of said converged optical beam radiated by said objective lens to said optical disk in accordance with the type of said optical disk determined by said discrimination means.

7. An optical-disk reproducing apparatus capable of reproducing an information signal from an optical disk with any of a plurality of types having different track pitches of recording tracks, said optical-disk reproducing apparatus comprising:

a disk-rotation-driving mechanism on which any one of optical disks with any of said types having different track pitches of recording tracks is to be selectively mounted;

a discrimination means for determining a type of an optical disk mounted on said disk-rotation-driving means;

a light source for emitting an optical beam having a wavelength of about 780 nm;

an objective lens having a numerical aperture (NA) of about 0.62 and serving as a means for converging said optical beam emitted by said light source and then radiating said converged optical beam to said optical disk; and a spot-diameter control means for controlling a spot diameter of said converged optical beam radiated by said objective lens to said optical disk, wherein said spot-diameter control means adjusts said spot diameter of said converged optical beam radiated by said objective lens to said optical disk in accordance with the type of said optical disk determined by said discrimination means.

8. An optical-disk reproducing apparatus according to claim 7, wherein said spot-diameter control means is an aberration-generating means for generating aberration in said converged optical beam radiated by said objective lens to said optical disk.

9. An optical-disk reproducing apparatus according to claim 8 wherein:

said aberration-generating means comprises a liquid-crystal device and a driving-voltage-applying means for applying a driving voltage to said liquid-crystal device; and said driving voltage applied by said driving-voltage-applying means to an electrode pattern of said liquid-crystal device is controlled to adjust the spot diameter of said converged optical beam radiated by said objective lens to said optical disk in accordance with said optical disk's type determined by said discrimination means.

* * * * *